US012700883B2

(12) United States Patent
Huang et al.

(10) Patent No.: US 12,700,883 B2
(45) Date of Patent: Aug. 4, 2026

(54) SYSTEM AND METHOD FOR IMPROVED AMPLITUDE SHIFT KEYING (ASK) COMMUNICATION IN WIRELESS POWER TRANSFER APPLICATIONS

(71) Applicant: STMicroelectronics International N.V., Geneva (CH)

(72) Inventors: Bin Huang, Beijing (CN); Xun Gong, Shenzhen (CN)

(73) Assignee: STMicroelectronics International N.V., Geneva (CH)

( * ) Notice: Subject to any disclaimer, the term of this patent is extended or adjusted under 35 U.S.C. 154(b) by 292 days.

(21) Appl. No.: 18/433,967

(22) Filed: Feb. 6, 2024

(65) Prior Publication Data

US 2025/0253877 A1 Aug. 7, 2025

(51) Int. Cl.
| | |
|---|---|
| *H04B 1/10* | (2006.01) |
| *H02J 50/12* | (2016.01) |
| *H02J 50/80* | (2016.01) |
| *H04B 1/00* | (2006.01) |
| *H04L 27/04* | (2006.01) |

(52) U.S. Cl.
CPC ................. *H04B 1/10* (2013.01); *H02J 50/12* (2016.02); *H02J 50/80* (2016.02); *H04L 27/04* (2013.01); *H04B 1/0003* (2013.01)

(58) Field of Classification Search
CPC .. H02J 50/80; H02J 50/12; H02J 50/60; H02J 7/02; H04B 5/26; H04B 5/79; H04B 1/10; H04B 1/0003; H04L 27/04
See application file for complete search history.

(56) References Cited

U.S. PATENT DOCUMENTS

| | | | | |
|---|---|---|---|---|
| 7,595,676 B2 * | 9/2009 | Trifonov | .............. | H03K 5/2481 |
| | | | | 327/205 |
| 2016/0134263 A1 | 5/2016 | Kris | | |
| 2018/0091003 A1 * | 3/2018 | Akahori | ............. | G11C 16/3459 |
| 2023/0179223 A1 * | 6/2023 | Hammerschmidt | ... | H03K 5/086 |
| | | | | 341/143 |
| 2024/0291327 A1 * | 8/2024 | Kasireddy | ............... | H02J 50/80 |

FOREIGN PATENT DOCUMENTS

| | | |
|---|---|---|
| CN | 101989843 A | 3/2011 |
| CN | 102075168 A | 5/2011 |
| CN | 112953033 A | 6/2021 |
| CN | 214590788 U | 11/2021 |
| CN | 113708745 B | 11/2023 |

* cited by examiner

*Primary Examiner* — Curtis A Kuntz
(74) *Attorney, Agent, or Firm* — Crowe & Dunlevy LLC

(57) ABSTRACT

A comparator has a hysteresis value which is adjustable in response to a hysteresis setting control signal. An input of the comparator receives a modulated signal contaminated by in-band noise. A pulsed signal output from the comparator is converted by a digital to analog converter circuit an analog signal. That analog signal is converted by an analog to digital converter to a digital signal value. A comparison circuit compares the digital signal value to a threshold value and generates the hysteresis setting control signal to adjust the hysteresis value of the comparator in response to a result of the comparison in order to suppress the in-band noise from the output of the pulsed signal output from the comparator.

19 Claims, 5 Drawing Sheets

SYSTEM AND METHOD FOR IMPROVED AMPLITUDE SHIFT KEYING (ASK) COMMUNICATION IN WIRELESS POWER TRANSFER APPLICATIONS

TECHNICAL FIELD

The present invention generally relates to wireless power transfer and, in particular, to an improvement in amplitude shift keying (ASK) communication over a wireless power transfer interface.

BACKGROUND

Reference is made to FIG. 1 which shows a simplified block diagram of a wireless power transfer system 10. The system 10 includes a wireless power transmitter (TX) 12 and a wireless power receiver (RX) 14. There is a magnetic inductive coupling between the wireless power transmitter 12 and the wireless power receiver 14. Both the transmitter 12 and receiver 14 include a resonant circuit 16tx, 16rx formed by the series connection of a capacitor C and inductor L. The transmitter 12 and receiver 14 further include circuitry configured to handle communications and power transfer.

To set up power transfer from the transmitter 12 to the receiver 14, and to assist in the control of that power transfer, the transmitter 12 and receiver 14 execute a communications protocol with each other that is governed by a set industry standard (for example, using the Qi standard protocol as known to those skilled in the art and defined by the Wireless Power Consortium (WPC)). This communications protocol utilizes frequency shift keying (FSK) modulation for information communications sent from the transmitter 12 to the receiver 14 (for use, for example, in providing synchronization and information transfer to the receiver) and amplitude shift keying (ASK) modulation for communications sent from the receiver 14 to the transmitter 12 (for use, for example, in communicating requests and information to the transmitter). The FSK modulation is implemented by the transmitter 12 modulating its operating frequency. The ASK modulation is implemented by the receiver 14 modulating its reflected impedance.

Power transfer from the transmitter 12 to the receiver 14, and communication between the transmitter and receiver, are realized using the magnetic inductive coupling between the inductors L of the resonant circuits 16tx, 16rx. Because of this, communication between the transmitter and receiver will inevitably be affected by the in-band switching noise from the power transfer. In instances of high power transfer from the transmitter 12 to the receiver 14, this in-band noise can lead to communications failure for information transfer from the receiver to the transmitter. Communications failures during wireless power transfer can adversely impact the safety and efficacy of the power transfer operation. In practical applications, the communications robustness of the ASK modulation for communicating information from the receiver 14 to the transmitter 12 is worse than the communications robustness of the FSK modulation for communication from the transmitter 12 to the receiver 14.

There is a need in the art to improve communications robustness of the ASK modulation for communicating information from the receiver 14 to the transmitter 12.

SUMMARY

In an embodiment, a circuit comprises: a comparator having a hysteresis value which is adjustable in response to a hysteresis setting control signal; wherein an input of the comparator is configured to receive a modulated signal contaminated by in-band noise; a digital to analog converter circuit configured to convert a pulsed signal output from the comparator to an analog signal; an analog to digital converter configured to convert the analog signal to a digital signal value; and a comparison circuit configured to compare the digital signal value to a threshold value and generate the hysteresis setting control signal to adjust the hysteresis value of the comparator in response to a result of the comparison in order to suppress the in-band noise from the output of the pulsed signal output from the comparator.

In an embodiment, a method comprises: a) in response to a finish of a modulated signal frame, resetting a hysteresis of an adjustable hysteresis comparator; b) digital to analog converting a pulsed signal output from the adjustable hysteresis comparator to an analog signal; c) analog to digital converting the analog signal to a digital signal value; d) comparing the digital signal value to a threshold value; e1) where the digital signal value is less than the threshold value, increment a hysteresis value of the adjustable hysteresis comparator and return to step b); and e2) where the digital signal value is not less than the threshold value, utilize the hysteresis value of the adjustable hysteresis comparator until finish of a next modulated signal frame.

In an embodiment, a wireless power transfer system comprises: a wireless power transmitter; and a wireless power receiver; wherein said wireless power transmitter and wireless power receiver are coupled for power transfer from the wireless power transmitter to the wireless power receiver and coupled for information transmission from the wireless power receiver to the wireless power transmitter. The wireless power transmitter comprises: circuitry configured to receive a modulated information transmission signal from the wireless power receiver and generate a modulated signal contaminated by in-band noise; a comparator having a hysteresis value which is adjustable in response to a hysteresis setting control signal; wherein an input of the comparator is configured to receive the modulated signal contaminated by in-band noise; a digital to analog converter circuit configured to convert a pulsed signal output from the comparator to an analog signal; an analog to digital converter configured to convert the analog signal to a digital signal value; and a comparison circuit configured to compare the digital signal value to a threshold value and generate the hysteresis setting control signal to adjust the hysteresis value of the comparator in response to a result of the comparison in order to suppress the in-band noise from the output of the pulsed signal output from the comparator.

BRIEF DESCRIPTION OF THE DRAWINGS

For a better understanding of the embodiments, reference will now be made by way of example only to the accompanying figures in which.

DETAILED DESCRIPTION

Figure 1:
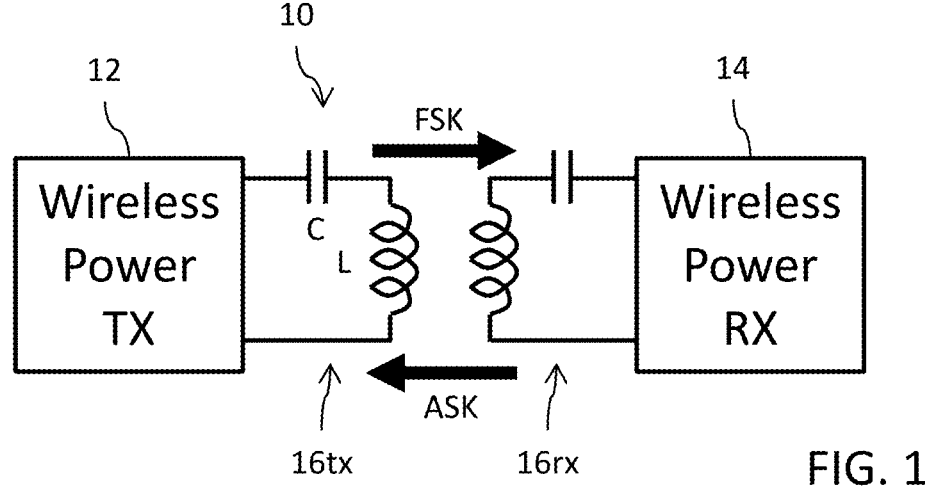
FIG. 1 shows a simplified block diagram of a wireless power transfer system.
Figure 2:
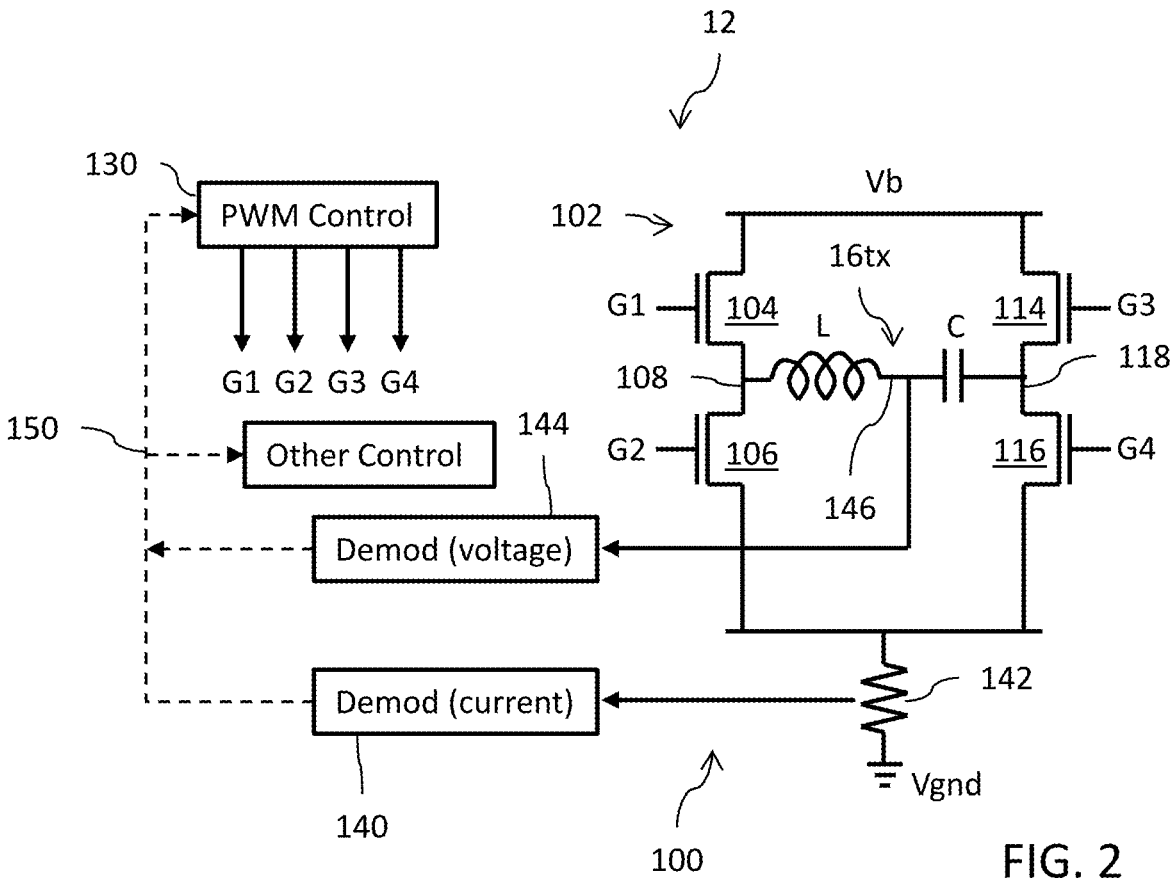
FIG. 2 shows a block diagram of a wireless power transmitter circuit.

Reference is now made to FIG. 2 shows a block diagram of a wireless power transmitter circuit 100. The circuit 100 may, for example, be used in connection with the transmitter 12 for the system 10 of FIG. 1. The resonant circuit 16*tx* for the wireless power transmitter circuit 100 is driven by a full bridge circuit 102. The full bridge circuit 102 includes a first half bridge formed by the series connection of a first high side drive transistor 104 and a first low side drive transistor 106. In this implementation, the transistors 104 and 106 may both be n-channel power MOSFET devices. The drain of transistor 104 is coupled to a bridge power supply node Vb and the source of transistor 104 is coupled to a first switching node 108. The drain of transistor 106 is coupled to the first switching node 108 and the source of transistor 106 is coupled to a ground reference node Vgnd. The full bridge circuit 102 further includes a second half bridge formed by the series connection of a second high side drive transistor 114 and a second low side drive transistor 116. In this implementation, the transistors 114 and 116 may both be n-channel power MOSFET devices. The drain of transistor 114 is coupled to the bridge power supply node Vb and the source of transistor 114 is coupled to a second switching node 118. The drain of transistor 116 is coupled to the second switching node 118 and the source of transistor 116 is coupled to the ground reference node Vgnd. The resonant circuit 16*tx* for the transmitter circuit 12 includes the inductor L and capacitor C coupled in series with each other between the first switching node 108 and the second switching node 118. For example, a first terminal of the inductor L is connected to the first switching node 108, a second terminal of the inductor L is connected to a first terminal of the capacitor C at intermediate node 146, and a second terminal of the capacitor C is connected to the second switching node 118. The selective actuation of the transistors 104, 106, 114 and 116 is controlled by a pulse width modulation (PWM) control circuit 130 configured to generate control signals (G1, G2, G3, G4) applied to the gate terminals of the transistors in the bridge circuit 102. Other operations of the transmitter in connection with wireless power transmission are controlled by other control circuits in a manner known in the art.

A first amplitude shift keying (ASK) demodulation circuit 140 of the wireless power transmitter circuit 100 is coupled to sense a current flowing through the first and/or second half bridges of the full bridge circuit 102 using a current sensing circuit 142 (for example, comprising a current sense resistor). A second amplitude shift keying (ASK) demodulation circuit 144 of the wireless power transmitter circuit 100 is coupled to sense a voltage at the intermediate node 146 between the series connected inductor L and capacitor C of the resonant circuit 16*tx*. The information transmitted from the receiver 14 (see, FIG. 1) that is demodulated by the first and second ASK demodulation circuits 140, 144 is processed in a feedback circuit 150 to control operation of the PWM control circuit 130. The feedback circuit 150 may, for example, include a signal processing (or microcontroller) circuit that processes the demodulated information and generates control signals for controlling the PWM control circuit 130. It will be understood that the demodulation result does not necessarily directly control the operation of the PWM control circuit 130. The feedback circuit 150 control is a logical control operation. The demodulation information may be used to adjust the frequency and/or duty cycle of the PWM signaling through the PWM control circuit 130. The demodulation information may be used to adjust voltage, for example, through other control circuits of the transmitter 12.

Figure 3:
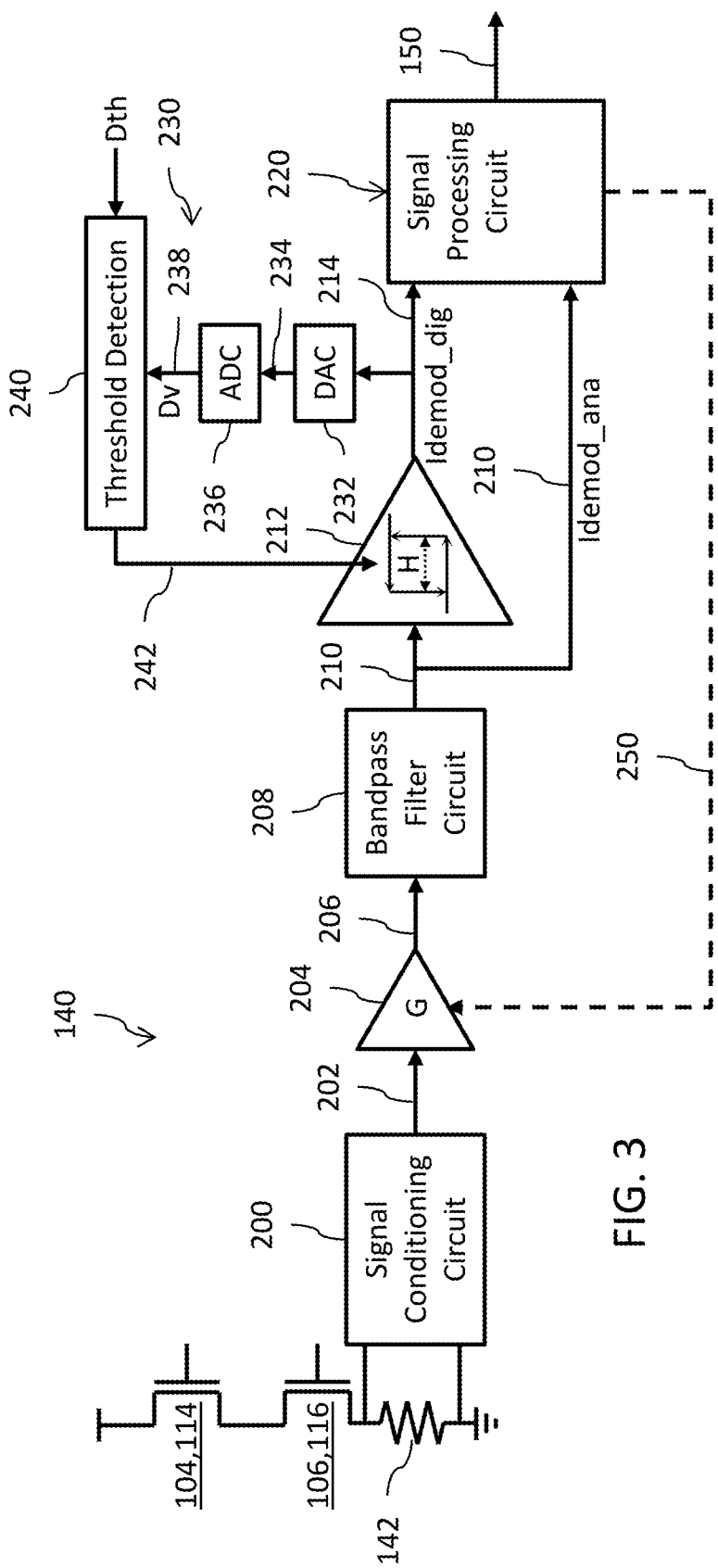
FIG. 3 shows a block diagram of a portion of an ASK demodulation circuit.

Reference is now made to FIG. 3 which shows a block diagram of a portion of the first ASK demodulation circuit 140. A signal conditioning circuit 200 is coupled to sense the voltage drop across the resistor of the current sensing circuit 142 and generate a sensed bridge current signal 202. The signal conditioning circuit 200 may, for example, comprise a differential amplifier circuit configured to sense a voltage drop across the resistor of the current sensing circuit 142. A gain stage circuit 204 applies a selected gain G to the sensed bridge current signal 202 to generate an amplified sensed bridge current signal 206. The amplified sensed bridge current signal 206 is filtered by a bandpass filter circuit 208 to filter out the carrier signal and generate an analog current demodulation signal (Idemod_ana) 210 which retains only the modulation signal (perhaps contaminated by in-band noise). The bandpass filter circuit 208 may, for example, comprise a cascade of a high pass filter (for example, $2^{nd}$ order Butterworth filter) and a low pass filter (for example, $2^{nd}$ order Butterworth filter). The analog current demodulation signal 210 is input to a comparator circuit 212 having an adjustable hysteresis H to generate a digital current demodulation signal (Idemod_dig) 214. The signal Idemod_dig 214, whether for ASK frames or in-band noise, can be regarded as a pulse width modulated (PWM) signal. The dotted double-ended arrow schematically illustrates stepped variation of the hysteresis H in response to a hysteresis control signal 242 (where the comparator circuit 212 is selectively controllable to be set to any one of a number of discrete hysteresis values). Control over the hysteresis H setting is made to substantially, if not completely, eliminate in-band switching noise. The analog current demodulation signal 210 and digital current demodulation signal 214 may then be further processed by a processing circuit 220 to generate the demodulated information sent by the receiver 14 of the wireless power transfer system 10. For example, the processing circuit 220 may implement a signal decoding operation. The output from the processing circuit 220 may be used in connection with the feedback circuit 150 which controls operation of the PWM control circuit 130 and/or other control circuits of the transmitter 12. Additionally, the analog current demodulation signal (Idemod_ana) 210 may be converted by an analog to digital converter to provide a digital value in a feedback control loop 250 that is used to adjust the gain setting of the gain stage circuit 204. Furthermore, the digital current demodulation signal (Idemod_dig) 214 is detected and decoded for recovering the information transmitted by the receiver circuit 14.

A hysteresis control circuit 230 operates to control setting of the adjustable hysteresis H of the comparator circuit 212. The hysteresis control circuit 230 includes a digital to analog converter (DAC) circuit 232 which converts the output pulses of the digital current demodulation signal (Idemod_dig) 214 to an analog voltage level 234 which is indicative of an amount of in band noise that is present in the ASK modulated signal. As an example, a resistive-capacitive circuit can be used to convert the PWM pulses of the digital current demodulation signal (Idemod_dig) 214 to the analog voltage level 234 whose level is dependent on duty cycle. The analog voltage level 234 for correct ASK frames is essentially a constant at a fraction of the supply Vdd voltage level, while the analog voltage level 234 for eliminated in-band noise is close the Vdd level. However, the analog voltage level 234 has a relatively lower value where in-band noise is present in the signal Idemod_dig 214. An analog to digital converter circuit 236 converts the analog voltage level 234 to a digital value (Dv) 238. A threshold comparison circuit 240 compares to the digital value 238 to a digital threshold (Dth). Where the digital value 238 is greater than or equal to the digital threshold (i.e., Dv≥Dth), no adjustment through the hysteresis control signal 242 is made to the adjustable hysteresis H of the comparator circuit 212 by the hysteresis control circuit 230. However, where the digital value 238 is less than the digital threshold (i.e., Dv<Dth), the hysteresis control circuit 230 incrementally increases the adjustable hysteresis H (for example, by one step value) of the comparator circuit 212 using the hysteresis control signal 242. This operation is repeated, with consequent incremental increases in the adjustable hysteresis H, until the digital value 236 is greater than or equal to the digital threshold (i.e., Dv≥Dth). It will be noted that if a maximum value for the adjustable hysteresis H is reached in the execution of this process, the threshold comparison circuit 240 will no longer try to perform an incremental increase of the adjustable hysteresis H.

In an embodiment, the gain stage circuit 204 may have a selectable gain level (for example, at a number of discrete values or over a range of values). As an example, without limitation, the gain stage circuit 204 may be operable a two discrete gain levels, with selection between those two levels being dependent on the analog current demodulation signal (Idemod_ana) 210 as discussed above. Alternatively, the gain stage circuit 204 may be omitted. Still further, gain control may instead be implemented using the signal conditioning circuit 200.

Figure 4:
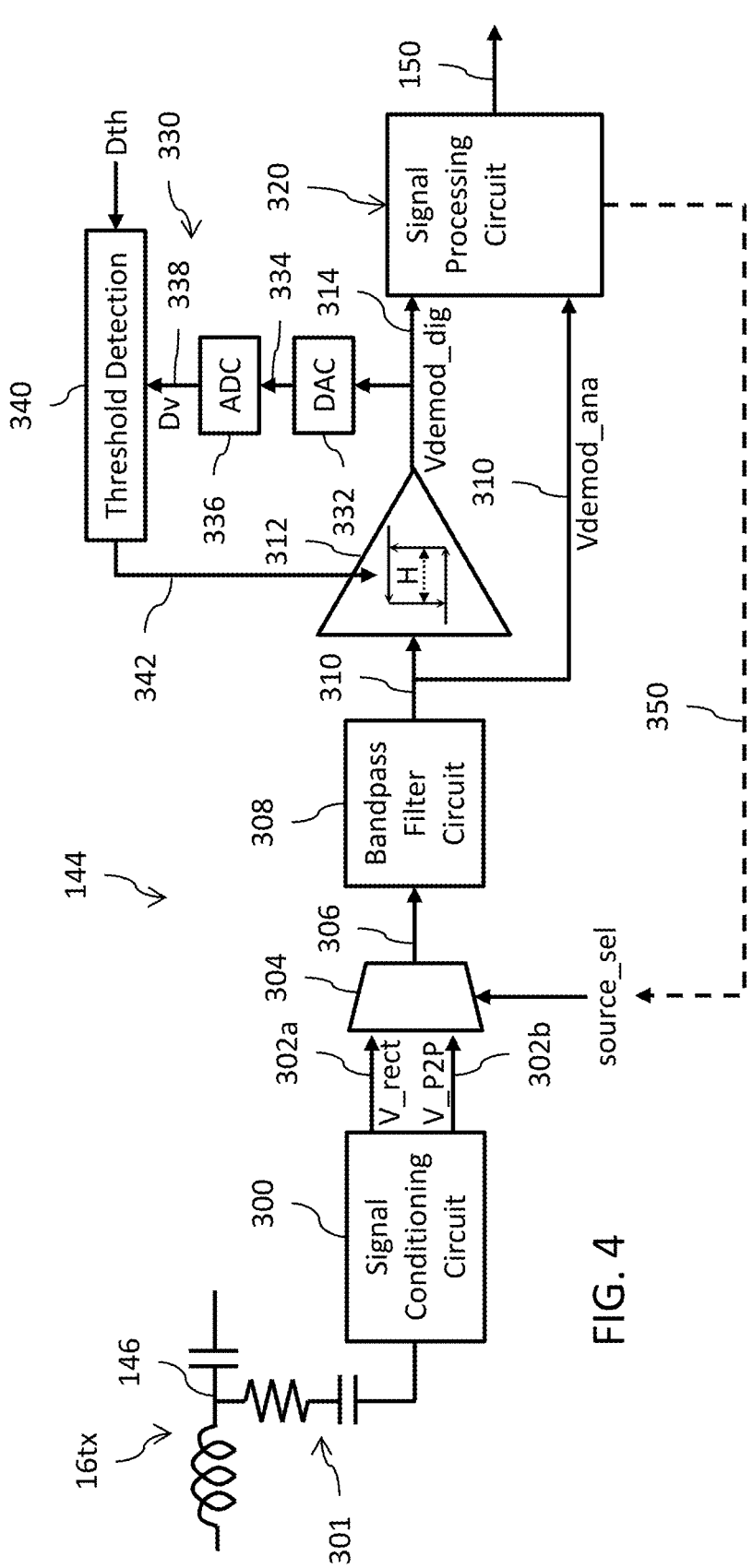
FIG. 4 shows a block diagram of a portion of another ASK demodulation circuit.

Reference is now made to FIG. 4 which shows a block diagram of a portion of the second ASK demodulation circuit 144. A signal conditioning circuit 300 is coupled to sense the voltage at the intermediate node 146 between the series connected inductor L and capacitor C of the resonant circuit 16tx. This voltage is high pass filtered by a DC blocking filter circuit 301. The signal conditioning circuit 300 includes a signal rectification circuit that processes the sensed voltage to generate a rectified voltage signal (V_rect) 302a. A peak-to-peak voltage sensing circuit of the signal conditioning circuit 300 processes the sensed voltage to generate a peak-to-peak voltage signal (V_P2P) 302b. Circuits which process an AC voltage signal, like the sensed and high pass filtered voltage of the resonant circuit 16tx, to generate a rectified signal and a peak-to-peak signal are well known to those skilled in the art. A switching circuit 304, for example in the form of an analog multiplexer circuit, selects one of the signal V_rect 302a or signal V_P2P 302b to generate a sensed voltage signal 306. Control over the signal selection made by the switching circuit 304 is effectuated using a source selection signal (source_sel). The selected sensed voltage signal 306 is filtered by a bandpass filter circuit 308 to filter out the carrier signal and generate an analog voltage demodulation signal (Vdemod_ana) 310 which retains only the modulation signal (perhaps contaminated by in-band noise). The bandpass filter circuit 308 may, for example, comprise a cascade of a high pass filter (for example, $2^{nd}$ order Butterworth filter) and a low pass filter (for example, $2^{nd}$ order Butterworth filter). The analog voltage demodulation signal 310 is input to a comparator circuit 312 having an adjustable hysteresis H to generate a digital voltage demodulation signal (Vdemod_dig) 314. The signal Vdemod_dig 314, whether for ASK frames or in-band noise, can be regarded as pulse width modulated (PWM) signal. The dotted double-ended arrow schematically illustrates stepped variation of the hysteresis H in response to a hysteresis control signal 342 (where the comparator circuit 312 is selectively controllable to be set to any one of a number of discrete hysteresis values). Control over the hysteresis H is made to substantially, if not completely, eliminate in-band switch noise. The analog voltage demodulation signal 310 and digital voltage demodulation signal 314 may then be further processed by a processing circuit 320 to generate the demodulated information sent by the receiver 14 of the wireless power transfer system 10. For example, the processing circuit 320 may implement a signal decoding operation. The output from the processing circuit 320 may be used in connection with the feedback circuit 150 which controls operation of the PWM control circuit 130 and/or other control circuits of the transmitter 12. Additionally, the analog voltage demodulation signal (Vdemod_ana) 310 may be converted by an analog to digital converter to provide a digital value in a feedback control loop 350 that is used to generate the source selection (source_sel) signal for selecting between (i.e., the best one of) the signal V_rect 302a or signal V_P2P 302b for use in the signal processing operation. Furthermore, the digital voltage demodulation signal (Vdemod_dig) 314 is detected and decoded for recovering the information transmitted by the receiver circuit 14.

A hysteresis control circuit 330 operates to control setting of the adjustable hysteresis H of the comparator circuit 312. The hysteresis control circuit 330 includes a digital to analog converter (DAC) circuit 332 which converts the output pulse of the digital voltage demodulation signal (Vdemod_dig) 314 to an analog voltage level 334 which is indicative of an amount of in band noise that is present in the ASK modulated signal. As an example, a resistive-capacitive circuit can be used to convert the PWM pulses of the digital voltage demodulation signal (Vdemod_dig) 314 to the analog voltage level 334 whose level is dependent on duty cycle. The analog voltage level 334 has a relatively lower value where in-band noise is present in the signal Vdemod_dig 314. An analog to digital converter circuit 336 converts the analog voltage level 334 to a digital value (Dv) 338. A threshold comparison circuit 340 compares to the digital value 338 to a digital threshold (Dth). Where the digital value 338 is greater than or equal to the digital threshold (i.e., Dv≥Dth), no adjustment through the hysteresis control signal 342 is made to the adjustable hysteresis H of the comparator circuit 312 by the hysteresis control circuit 330. However, where the digital value 338 is less than the digital threshold (i.e., Dv<Dth), the hysteresis control circuit 330 incrementally increases the adjustable hysteresis H (for example, by one step value) of the comparator circuit 312 using the hysteresis control signal 342. This operation is repeated, with consequent incremental increases in the adjustable hysteresis H, until the digital value 336 is greater than or equal to the digital threshold (i.e., Dv≥Dth). It will be noted that if a maximum value for the adjustable hysteresis H is reached in the execution of this process, the threshold comparison circuit 340 will no longer try to perform an incremental increase of the adjustable hysteresis H.

Figure 5A:
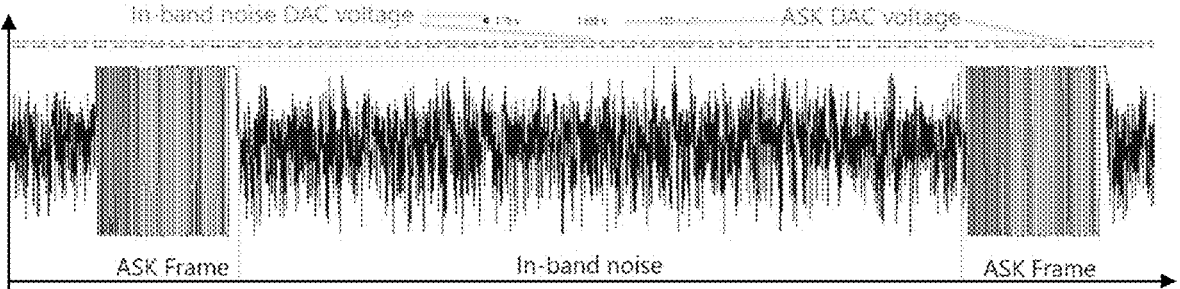
FIGS. 5A-5C illustrate signal waveforms at the output of the hysteresis comparator of the ASK demodulation circuit under different adjustable hysteresis values.

Reference is now made to FIG. 5A which shows a signal (214, 314) waveform at the output of the hysteresis comparator 212, 312 where in-band switching noise (In-band noise) and the ASK modulated information (ASK Frame) are simultaneously present at the output of the hysteresis comparator 212, 312 in the case where the adjustable hysteresis H is set at a minimum value. A concern with this is that the in-band noise may contaminate the ASK frames, or decoding operations may be triggered by the in-band noise.

Figure 5B:
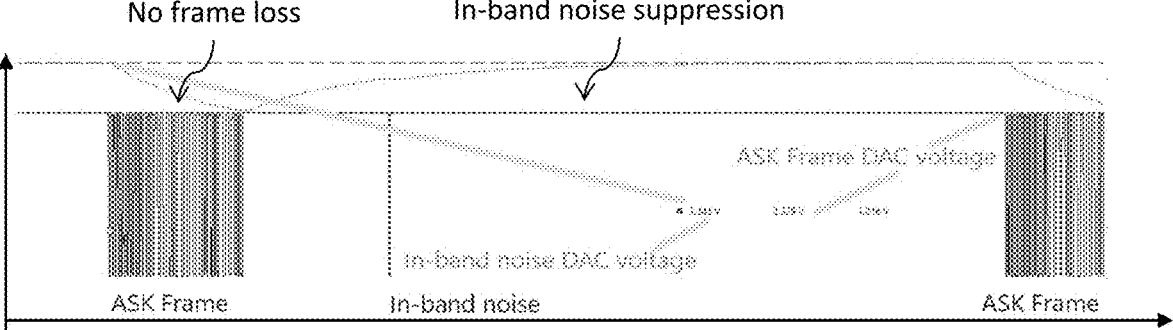

FIG. 5B shows the signal (214, 314) waveform at the output of the hysteresis comparator 212, 312 where the hysteresis control circuit 230, 330 operates to control the setting of the adjustable hysteresis H at a value where the digital value 236, 336 is greater than or equal to the digital threshold (i.e., Dv≥Dth). It will be noted that the in-band switching noise (In-band noise) has been substantially, if not completely, eliminated without adverse effect (for example, frame loss) on the ASK modulated information (ASK Frame).

Figure 5C:
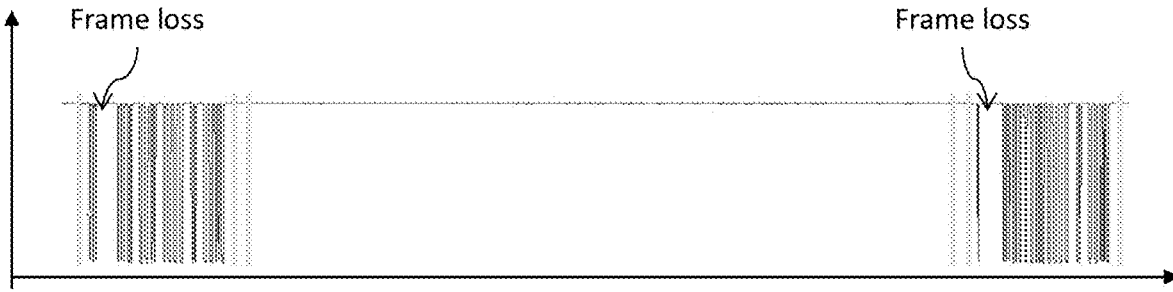

For comparison purposes, FIG. 5C shows the signal (214, 314) waveform at the output of the hysteresis comparator 212, 312 where the adjustable hysteresis H has been set at a maximum value. It will be noted that in this case the in-band switching noise (In-band noise) has been substantially, if not completely, eliminated but there is a clear adverse effect on the ASK modulated information (ASK Frame) showing the destruction of ASK frames. It is accordingly critical to control the incrementation of the value for the adjustable hysteresis H only up to the setting point where in-band switching noise (In-band noise) is controlled without loss of fidelity of the ASK modulated information (ASK Frame).

Figure 6:
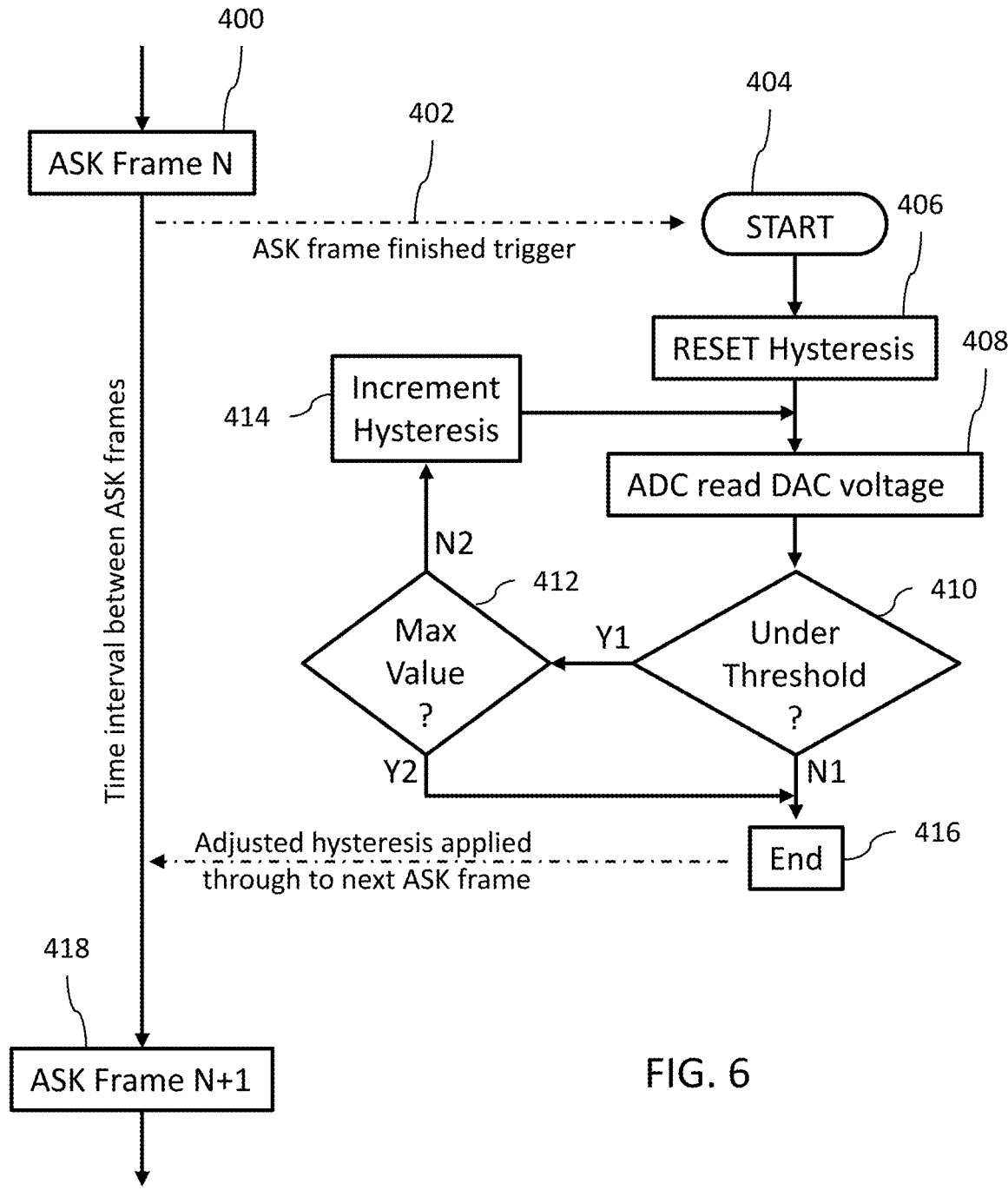
FIG. 6 is a flow diagram illustrating operation of a hysteresis control circuit for controlling setting of the adjustable hysteresis of the hysteresis comparator of the ASK demodulation circuit.

Reference is now made to FIG. 6 which shows a flow diagram illustrating operation of a hysteresis control circuit for controlling setting of the adjustable hysteresis of the hysteresis comparator of the ASK demodulation circuit. The process is executed within the time interval between successive ASK frames. Following completion of receipt of a given ASK frame (reference 400), a frame finished trigger (reference 402) controls start (reference 404) of the hysteresis H adjustment process. The value of the adjustable hysteresis H is reset (reference 406) to a minimum value. The analog to digital converter circuit 236, 336 then reads and converts (reference 408) the analog voltage level 234, 334 at the output of the digital to analog converter circuit 232, 332 to generate the digital value (Dv) 238, 338. A comparison (reference 410) is then made of the digital value (Dv) 238, 338 to the digital threshold (Dth). Where the digital value (Dv) 238, 338 is less than or equal to the digital threshold (Dth), path marked "Y1", a test is made (reference 412) as to whether the current hysteresis value is at a maximum level. If not, path marked "N2", the current hysteresis value is incremented (reference 414) and the process returns to step 408. Conversely, if either a) the digital value (Dv) 238, 338 is greater than the digital threshold (Dth) through the path marked "N1" or b) the maximum hysteresis value has been reached through the path marked "Y2", the process ends (reference 416) and the then current selected (adjusted) hysteresis value is applied by the hysteresis comparator 212, 312 for the duration of time between ASK frames. The process as described above is then repeated with the finish of the next and each subsequent ASK frame (reference 418).

In an embodiment, the subsequent ASK frame (reference 418) may comprise the next ASK frame which immediately follows the given ASK frame (reference 400) as shown. It will be noted, however, that the subsequent ASK frame (reference 418) may instead comprises an ASK frame which follows, not necessarily immediately, the given ASK frame (reference 400) in which case the inter-frame time interval would be between two non-consecutive ASK frames.

The solution presented herein performs a closed-loop control on the adjustable hysteresis H of the hysteresis comparator 212, 312 according to the level characteristics of the signal domain (ASK frames) and noise domain (in-band switching noise) using a DAC/ADC operation performed on the PWM signal pulses output from the hysteresis comparator 212, 312 followed by a comparison with a threshold value selected to correspond to a point where in-band switching noise is controlled without risking frame loss of the ASK modulated information (ASK Frame). This solution has advantages over previous solutions for addressing in-band noise contamination of being operable in real-time (as opposed to in an open loop mode with a fixed hysteresis setting), with a high robustness (i.e., dynamically adjusted according to noise and operated on a frame by frame basis), and with low power consumption.

It will be noted that although a preferred implement of the process of FIG. 6 is to perform the hysteresis adjustment on a frame by frame basis as shown, there are other options. For example, the hysteresis adjustment process can be performed on a periodic basis (not tied to the interval between frames) or on an event driven basis (not specific to finish of each ASK frame).

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:
   a comparator having a hysteresis value which is adjustable in response to a hysteresis setting control signal;
   wherein an input of the comparator is configured to receive a modulated signal contaminated by in-band noise;
   a digital to analog converter circuit configured to convert a pulsed signal output from the comparator to an analog signal;
   an analog to digital converter configured to convert the analog signal to a digital signal value; and
   a comparison circuit configured to compare the digital signal value to a threshold value and generate the hysteresis setting control signal to adjust the hysteresis value of the comparator in response to a result of the comparison in order to suppress the in-band noise from the output of the pulsed signal output from the comparator.

2. The circuit of claim 1, wherein the modulated signal is derived from an amplitude shift keyed (ASK) information communication signal.

3. The circuit of claim 2, wherein the ASK information communication signal is generated by modulating reflected impedance in a wireless power transfer system.

4. The circuit of claim 1, wherein the hysteresis value of the comparator is incrementally adjusted by a step by the hysteresis setting control signal when the digital signal value is less than the threshold value.

5. The circuit of claim 1, further comprising:
   a current sensing circuit configured to sense current flowing in a bridge circuit and generate a current sense signal; and
   a bandpass filter circuit configured to filter the current sense signal to generate the modulated signal.

6. The circuit of claim 5, wherein said bridge circuit is coupled to drive a resonant circuit of a wireless power transmitter.

7. The circuit of claim 1, further comprising:

a voltage sensing circuit configured to sense voltage in a resonant circuit and generate a voltage sense signal; and a bandpass filter circuit configured to filter the voltage sense signal to generate the modulated signal.

8. The circuit of claim 7, wherein the voltage sense signal is a rectified voltage signal.

9. The circuit of claim 7, wherein the voltage sense signal is a peak to peak voltage signal.

10. The circuit of claim 7, wherein said resonant circuit is driven by a bridge circuit of a wireless power transmitter.

11. A method, comprising:

a) in response to a finish of a modulated signal frame, resetting a hysteresis of an adjustable hysteresis comparator;

b) digital to analog converting a pulsed signal output from the adjustable hysteresis comparator to an analog signal;

c) analog to digital converting the analog signal to a digital signal value;

d) comparing the digital signal value to a threshold value;

e1) where the digital signal value is less than the threshold value, incrementing a hysteresis value of the adjustable hysteresis comparator and return to step b); and e2) where the digital signal value is not less than the threshold value, utilizing the hysteresis value of the adjustable hysteresis comparator until finish of a following modulated signal frame.

12. The method of claim 11, wherein step e1 further comprises checking whether the hysteresis value of the adjustable hysteresis comparator is at a maximum value, and if so then utilizing the maximum value of the hysteresis value until finish of a next modulated signal frame.

13. The method of claim 11, wherein the following modulated signal frame is a next modulated signal frame immediately after said modulated signal frame.

14. A wireless power transfer system, comprising:

a wireless power transmitter;

a wireless power receiver;

wherein said wireless power transmitter and wireless power receiver are coupled for power transfer from the wireless power transmitter to the wireless power receiver and coupled for information transmission from the wireless power receiver to the wireless power transmitter;

wherein the wireless power transmitter comprises:

circuitry configured to receive a modulated information transmission signal from the wireless power receiver and generate a modulated signal contaminated by in-band noise;

a comparator having a hysteresis value which is adjustable in response to a hysteresis setting control signal;

wherein an input of the comparator is configured to receive the modulated signal contaminated by in-band noise;

a digital to analog converter circuit configured to convert a pulsed signal output from the comparator to an analog signal;

an analog to digital converter configured to convert the analog signal to a digital signal value; and a comparison circuit configured to compare the digital signal value to a threshold value and generate the hysteresis setting control signal to adjust the hysteresis value of the comparator in response to a result of the comparison in order to suppress the in-band noise from the output of the pulsed signal output from the comparator.

15. The system of claim 14, wherein the modulated information transmission signal is an amplitude shift keyed (ASK) information communication signal.

16. The system of claim 15, wherein the ASK information communication signal is generated by modulating reflected impedance in the wireless power transfer system.

17. The system of claim 15, wherein the hysteresis value of the comparator is incrementally adjusted by a step by the hysteresis setting control signal when the digital signal value is less than the threshold value.

18. The system of claim 14, wherein the modulated signal contaminated by in-band noise is generated by sensing current flowing in a bridge circuit of the wireless power transmitter that is configured to drive a resonant circuit.

19. The system of claim 14, wherein the modulated signal contaminated by in-band noise is generated by sensing voltage in a resonant circuit of the wireless power transmitter that is driven by a bridge circuit.

* * * * *